Jan. 13, 1959 M. CAMRAS 2,868,890

NON-LINEAR MAGNETIC RECORDING COMPENSATION

Filed Sept. 4, 1953 3 Sheets-Sheet 1

Inventor

MARVIN CAMRAS

By Hill, Sherman, Meroni, Gross & Simpson Attys.

NON-LINEAR MAGNETIC RECORDING COMPENSATION

Filed Sept. 4, 1953 3 Sheets-Sheet 2

Inventor
MARVIN CAMRAS
By Hill, Sherman, Meroni, Gross & Simpson Attys.

Jan. 13, 1959 M. CAMRAS 2,868,890

NON-LINEAR MAGNETIC RECORDING COMPENSATION

Filed Sept. 4, 1953 3 Sheets-Sheet 3

Inventor

MARVIN CAMRAS

By Hill, Sherman, Meroni, Gross & Simpson Attys.

2,868,890

NON-LINEAR MAGNETIC RECORDING COMPENSATION

Marvin Camras, Chicago, Ill., assignor to Armour Research Foundation of Illinois Institute of Technology, Chicago, Ill., a corporation of Illinois Application September 4, 1953, Serial No. 378,571

1 Claim. (Cl. 179—100.2)

The present invention relates to non-linear magnetic recording compensation and more particularly to systems and methods of magnetic recording linearly and compensating for the non-linear magnetic characteristic of magnetic record mediums.

A major problem which has continuously faced the researchers and developing scientists in the field of magnetic recording has been the problem of providing high fidelity magnetic recording on and reproduction from the magnetic record mediums employed. Numerous advances have been made in the quality of the magnetic record mediums, such as wires and tapes and belts, etc., but these systems have inherently had non-linear retention and transfer characteristics.

To overcome the difficulty of non-linearly and recording and reproducing by virtue of non-linear characteristics of the magnetic record medium, such systems as D.-C. biasing and A.-C. biasing have been developed. Although A.-C. biasing is in common use today and provides a most advantageous type of system for obtaining high fidelity magnetic recording, other systems have been tried as attempts to overcome the non-linear magnetic characteristic of the record mediums. One such other system employs super-imposing the intelligence signal to be recorded upon a square wave of the same time base as the individual cycles of the intelligence signal and thereafter impressing that sum potential upon the magnetic record medium. Experience shows that such a system is critical to adjust, introduces spurious signals, especially at low levels, and introduces a high degree of distortion by virtue of the sharp changes in the signal as it is impressed upon the record thereby resulting in an undue increase in the harmonic content of the recorded signal.

For an understanding of the present invention, the reader should first understand the nature and appearance of the magnetic transfer characteristic of a magnetic record medium. This characteristic has an instep and a knee in each the first and third quadrants, assuming that the curve is symmetrical about the origin. Recording between the insteps and the knees in each quadrant through which the characteristic curve extends provides a substantially linear recording. When the system for recording is not provided with bias, signals have to pass through the instep of the curve and thereby are recorded in a most non-linear manner.

When one form of D.-C. biasing is employed, magnetic recording is effected in only the small linear portion between the instep and the knee in, for example, the first quadrant of the characteristic curve. On the other hand, when A.-C. biasing is employed, recording is effected in both the first and third quadrants, and a wider recording range is obtained.

Although A.-C. biasing uses the recording region to good advantage, it has the disadvantages of demagnetization, especially at high audio frequencies, bias noise, and beat tones between the bias and the audio harmonics.

By the present invention, however, I am able to obviate all of these above described difficulties and am able to effect linear magnetic recording through a greatly increased range of amplitude including linear magnetic recording even though the insteps and the knees of the magnetic characteristic curve and transfer characteristic of the magnetic record medium. By the system of the present invention, I am able to obviate the difficulty of limited amplitude recording on a single linear portion of the magnetic characteristic and transfer characteristic which limitation is present in employing the stated form of direct current biasing. Similarly, I am able to obviate, through employment of the present invention, certain disadvantages of A.-C. biasing. Also, by the system of the present invention, I am able to overcome the difficulties of low fidelity recording which are present when the intelligence signal to be recorded is super-imposed upon a square wave or the like as described above.

The system of the present invention, as further described in detail together with a detailed description of preferred embodiments of the present invention hereinbelow, includes distortion of the intelligence signal to be recorded in a manner compensating for the non-linear transfer characteristic of the magnetic record medium such that the resultant effect of the distorted signal and non-linear characteristic is a linear recording of high fidelity and increased amplitude range. By the present invention, there is provided substantially linear magnetic recording over a maximum range of amplitude variation from zero signal intensity to maximum signal intensity by virtue of distorting the signal in a manner complementary to the magnetic transfer characteristic of the record medium. The distortion of the input intelligence signal is substantially inverse with respect to the magnetic transfer characteristic of the record medium so that the resultant effect is a linear recording of maximum range.

Therefore, it is an important object of the present invention, to provide a new and improved magnetic recording system and method giving substantially linear recording.

It is another important object of the present invention to provide a system and method for linearly recording an intelligence signal on a magnetic record medium having a non-linear magnetic transfer characteristic.

Still another object of the present invention is to provide a system and method for linearly magnetically recording on a record medium having non-linear magnetic characteristics by applying to said medium an intelligence signal distorted relatively inversely, complementary, with respect to the non-linear characteristic of the medium.

It is still another important object of the present invention to provide a system and method for distorting an input intelligence signal in a manner complementary and substantially inverse with respect to the non-linear characteristic of the magnetic record medium upon which said signal is to be linearly recorded.

It is still another object of the present invention to provide a system and method for distorting an intelligence signal to provide the same with a characteristic curve which is inversely and complementary related to the non-linear magnetic characteristic of the magnetic medium upon which the signal is to be recorded.

Yet another object of the present invention is to provide a magnetic record member of non-linear magnetic characteristics with a signal linearly recorded thereon over a range including the non-linear portion of the magnetic characteristic of the record member.

Yet another important object of the present invention is to provide a system and method for magnetic recording including a feed-back system for distorting the intelligence signal to be recorded complementary to the non-linear magnetic transfer characteristic of the record member.

Yet another object of the present invention is to provide a magnetic recording method and system for linearly magnetically recording an intelligence signal on a magnetic record medium having non-linear magnetic characteristics by directly distorting the signal to be recorded.

Yet another object of the present invention is to provide systems for distorting the intelligence signal as described through feed-back distortion systems and through direct distortion and attenuation systems.

Yet another object of the present invention is to distort an intelligence signal to be magnetically recorded such that low amplitude signals are relatively amplified and high amplitude signals are relatively attenuated for compensating for the non-linear magnetic transfer characteristics of the record medium upon which the signal is to be linearly recorded.

Still other objects, features and advantages of the present invention will become readily apparent from the foregoing as well as from the following detailed description and from the appended claim and from the accompanying drawings in which like reference numerals refer to like parts and in which:

Figures 1, 2:
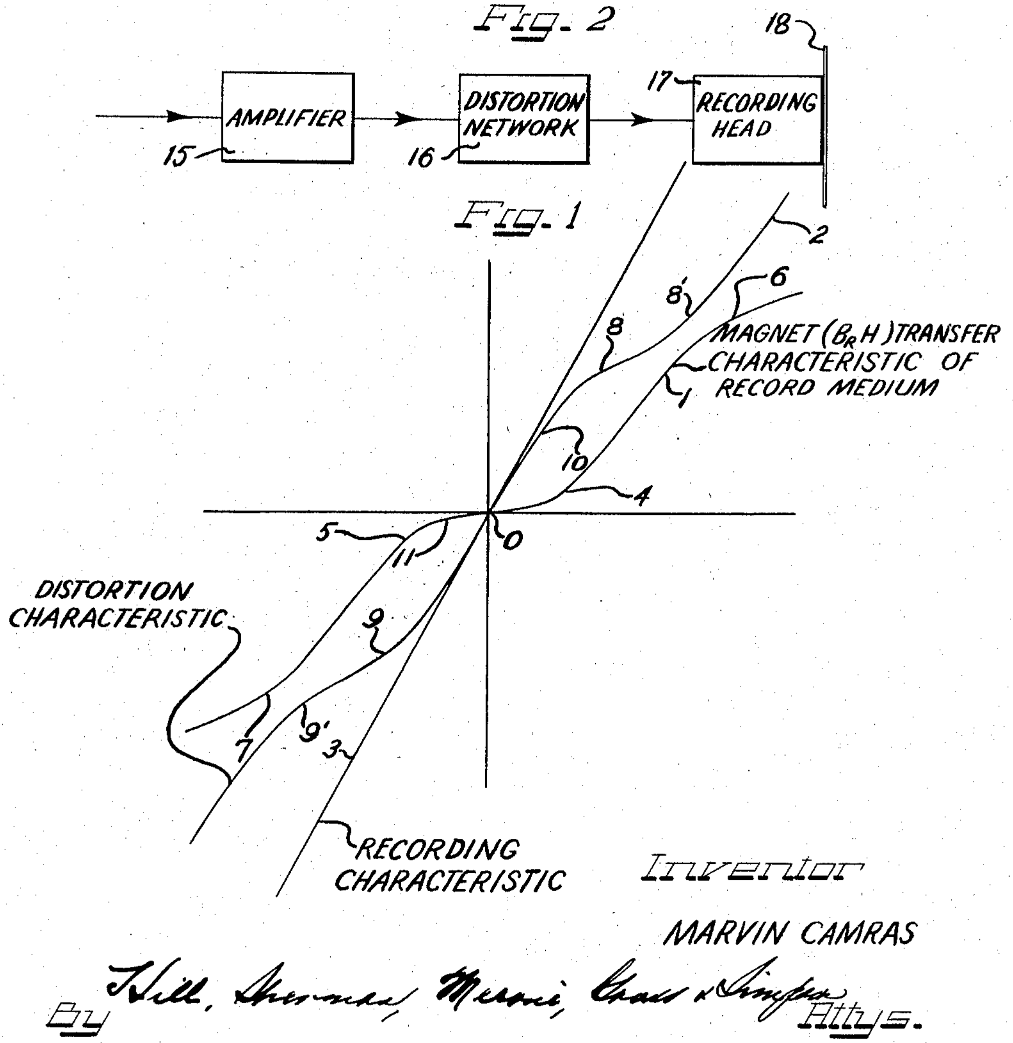
Figure 1 is a graphic illustration of the non-linear magnetic transfer characteristic of a record medium as compared with the distortion characteristic to be imparted to the intelligence signal to be recorded on the medium and the resultant linear magnetic recording characteristic.
Figure 2 is a block schematic representation of a recording system embodying the principles of the present invention.

Attention is first directed to Figure 1 wherein there is graphically illustrated several curves which are of great assistance in understanding the principles of the present invention. The curve 1 graphically illustrates the ($B_r$—H) flux density retained $B_r$ vs. magnetization force applied H, magnetic transfer characteristic of the record medium, while the curve 2 represents the distortion characteristic to be imparted to the intelligence signal to be recorded and the curve 3 represents the resultant linear recording characteristic in accordance with the principles of the present invention.

When a magnetic record medium is subjected to a magnetization force H, a corresponding flux density B is set up. If the magnetization force reaches any particular desired level then the flux density will also reach a corresponding level but the relationship between these values will not be a linear one. Following application of a magnetization force H of sufficient strength to saturate the record member at a flux density $B_{max}$, any further increase in the magnetization force will produce little or no increase in the flux density of the record medium. On the other hand, the application of a magnetization force of a reasonably small value will have an almost negligible effect upon the flux density B in the record member. Continued increase in the magnetization force will, at a determinable level thereof, create an increasing rate of increase in the flux density and thereafter the flux density will increase more linearly with the increase in magnetization force until saturation is approached after which the flux density will have a decreasing rate of increase until saturation is actually reached. The region of the B—H curve which represents the sharp increase in the rate of increase of flux density with small increments of increase in magnetization force may be termed the instep of the magnetization curve and the region of the curve wherein the rate of increase of flux density decreases with increases of magnetization is termed the knee of the magnetization characteristic. Removal of the magnetization force will not cause complete loss of magnetization of a magnetic record member previously magnetized to some predetermined level. The flux density which remains or is retained by the record member is somewhat less than the flux density present in the member while the same is subjected to the predetermined magnetization force and this retained flux density may be expressed as $B_r$, remnant induction or remnant flux density.

A plot of this remnant flux density against the actual magnetizing force which cause the same in a virgin magnetic record member results in the characteristic curve 1 of Figure 1 and labeled magnetic ($B_r$—H) transfer characteristic of record medium. Usually, the $B_r$—H characteristic of a record medium has insteps 4 and 5 of rapidly increasing slope and knees 6 and 7 of rapidly decreasing slope in the first and third quadrants respectively. The rate of change of slope at the knees 6 and 7 is not as great as the change at insteps 4 and 5. The insteps 4 and 5 and knees 6 and 7 of this transfer characteristic for the magnetic record medium are creative of sharp non-linear magnetic recording characteristics on the medium. It will be understood, of course, from the foregoing, that this magnetic transfer characteristic is the magnetic recording characteristic for recording on a virgin record member (a virgin record member is one which has never been magnetized or has had the signal erased therefrom) and is termed the transfer characteristic since it represents the actual recording characteristic or transference of the signal to the record member. It will be seen by observation of this curve that the increase in remnant flux density is extremely gradual for low values of magnetization force H as indicated by the very shallow sloped portion of the curve 1 between the origin O and the insteps 4 and 5 thereof. As the signal intensity or magnetization force increases, however, to the region of the insteps 4 and 5, the rate of increase in remnant flux density rapidly increases in the manner of the curvature of insteps 4 and 5 in the characteristic curve. Thereafter, for a fairly susbtantial range, the relationship between the remnant flux density and the magnetization force continues to rise rapidly until the record member approaches saturation. As the record member approaches saturation, the rate of increase of the remnant flux density decreases in the manner of the curvature of the knees 6 and 7 in the transfer characteristic curve. Further increase in the signal intensity or magnetization force will result in little increase in the remnant flux density since the magnetic record member will have reached the saturation range at these levels.

Application of a signal to be recorded on a magnetic record member having this type of transfer characteristic will necessarily result in a non-linear recording of the signal. For extremely low intensity signals, there will be very little recording of the same since the remnant flux density will have remained at substantially low values. For intermediate signal strengths, the recorded signal will be quite non-linear since the low intensity portions of the signal will be practically unrecorded and as the signal increases, the recording thereof will sharply increase. For very high intensity signals, there will be even more non-linearity since they will be flattened off at the top by virtue of saturation of the record member.

If, however, as in accordance with the principles of the present invention, the signal is distorted so that it has a distortion characteristic as indicated by the curve 2 of Figure 1, then the effective recording will be linear since there will be relative high amplification of low intensity signals or of the low intensity portion of the intelligence signals and a relatively low amplification of intermediate and higher intensity signals. That is, the low intensity portions of the signals will effectively be greatly amplified while the higher intensity portions thereof will not be so amplified.

It is an important feature of the distortion characteristic too, in accordance with the principles of the present invention, that the same be provided with knees 8 and 9, in the first and third quadrants, respectively, complementary to the insteps 4 and 5 of the transfer characteristic of the record medium. By the provision of these knees 8 and 9 on the distortion characteristic, the distortion characteristic itself may be made entirely complementary with respect to the transfer characteristic so that the ultimate recording characteristic is substantially linear as indicated by the dashed linear curve 3. Stated another way, by provision of the knees 8 and 9 in the distortion characteristic, the whole distortion characteristic curve 2 will have a relationship with respect to the magnetic transfer characteristic of the magnetic record medium which is substantially an inverse relationship. Thus, a plot of the distortion characteristic 2 will have substantially high gain linear portions 10 and 11 in the first and third quadrants, respectively, which correspond to the very low recording portion between the insteps 4 and 5 of the record member characteristic 1. The "high gain" linear portion between the knees 8 and 9 of the distortion characteristic operates to effect recording of low intensity signals and the low intensity portions of higher intensity signals. Thereafter, the distortion characteristic will effectively "drop-off" in a curved knee such as the knees 8 and 9 complementary, inversely, with respect to the magnetization transfer curve of the record medium so that recordation of the signal is continued linearly. Beyond these knees 8 and 10 the distortion characteristic continues to be complementary or inversely related to the magnetic transfer characteristic of the record medium. Systems embodying the principles of the invention may be provided with such a double curvature distortion characteristic as will compensate for both the insteps and the knees of curve 1. Note insteps 8' and 9' of curve 2.

It will, therefore, be readily understood that by the provision of distortion of the intelligence signal to be recorded on a non-linear magnetic record member in a manner complementary or inversely related to the non-linear characteristic of the record member, will be operative to effect linear recordation of an intelligence signal through a maximum range of intensity variations for the signal. The phrase "distorting the signal complementary to the non-linear characteristic of the magnetic record medium" as used hereinafter in the claims will be used to refer to the provision of a distortion characteristic such as to produce a linear recording over a substantial range of inputs.

A preferred embodiment of a system operative in accordance with the principles and method of the present invention is illustrated in block diagrammatic illustration in Figure 2 and demonstrates that the present invention may be embodied by passing an input signal through a proper distortion circuit or network and thereafter to a recording head for recording upon a magnetic record medium. The distorter network will preferably have the distortion characteristic 2, of Figure 1, while the magnetic record member has the magnetic transfer characteristic 1 of Figure 1. In this preferred embodiment of the invention, the input signal is supplied to an amplifier or the like 15 for the purposes of amplification of the intelligence signal with high fidelity and thereafter is passed to a distortion network generally enclosed in the "black-box" 16 for distortion of the signal in accordance with the principles of the present invention before the same is passed to a recording head or the like 17 for recording the signal on the record member 18, in accordance with the principles of the present invention. The amplifier 15 may include the usual pre-equalizer for magnetic recording which emphasizes high frequencies and sometimes also low frequencies of signals to be recorded.

By providing the distorter network with a distortion characteristic such as the characteristic 2 of Figure 1 the input intelligence signal supplied thereto, either directly from such input means as may be desired for the intelligence pickup or from an amplifier such as the amplifier 15, will be distorted in accordance with that distortion characteristic before energization of the recording head. Energization of the voice coil or the like in the recording head with such a distorted signal will cause a distorted intelligence signal to be applied to the magnetic record medium 18 which is relatively moving with respect to the head. The combined effect of the non-linear distorted signal and the non-linear magnetic transfer characteristic of the recording medium 18 will be effective to cause linear recording of the signal and this result will obtain for signals ranging in amplitude from zero intensity to a maximum intensity extending into the saturation range for magnetization of the magnetic record member 18.

Figure 3:
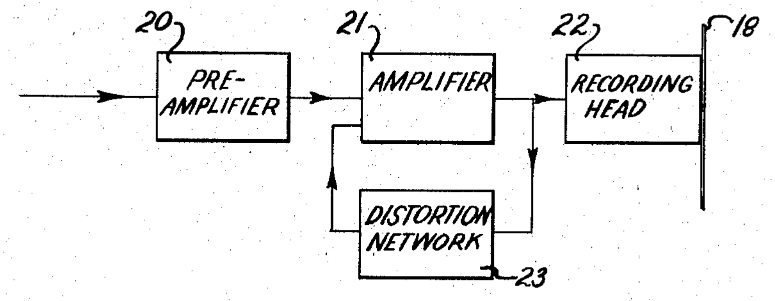
Figure 3 is a block schematic representation of another preferred system embodying the principles of the present invention and including a distortion feed-back system.

Another embodiment of the present invention incorporating the features and advantages thereof is illustrated in Figure 3 wherein the principal input intelligence signal is fed into a preamplifier and pre-equalizer stage 20, or the like, and thereafter successively to an amplifier 21 and a recording head 22 for recording of the signal upon a relatively moving magnetic record member 18. The signal applied to the record member 18 by the recording head 22 is not in linear relation with the input signal applied to the mixer stage 20 or the like but is distorted in accordance with the distortion characteristic 2 of Figure 1 thereby embodying the principles of the present invention for linearly recording the signal. A portion of the output of the amplifier 21 is taken off and fed to a distortion network such as a distortion amplifier or the like 23 which amounts to a feed-back system of distorting characteristics. The output of the distortion network or amplifier 23 is then fed back to the amplifier 21 where it is combined with the input signal to effect distortion thereof in accordance with the principles of the present invention so that the ultimate signal, which energizes the voice coil or the like of the recording head 22, is distorted having a distortion characteristic such as the characteristic 2 of Figure 1 complementary to the non-linear magnetic transfer characteristic of the relatively moving record medium 18. By distorting the signal in this manner substantially linear recording of the input intelligence signal may be effected over a maximum range of intensity and with high fidelity as described above.

These two system embodying the principles of the present invention, as diagrammatically illustrated in block schematic illustration in Figures 2 and 3, are each preferred forms of systems operable in accordance with the method and the principles of the present invention to effect a substantially linear recording over the entire range of signal amplitudes on a magnetic record medium having a non-linear transfer characteristic. It will be understood, of course, that numerous variations and other systems may be constructed to embody the principles of the present invention and perform the method of the present invention but the above are illustrative of preferred forms therefore and illustrate, in general, a preferred manner of embodying the pinciples of the present invention.

Each of these systems is open to numerous modifications and variations and whereas Figures 4, 5, 6, 7 and 8 are illustrative of feed-back distortion systems embodying the principles of the present invention, Figures 9–14 are illustrative of forms of direct distortion systems embodying the principles of the present invention and operable as the distortion network 16 of the system of Figure 2. Attention is first directed to the feed-back systems of Figures 4–8 and immediately to the system of Fig. 4.

Figure 4:
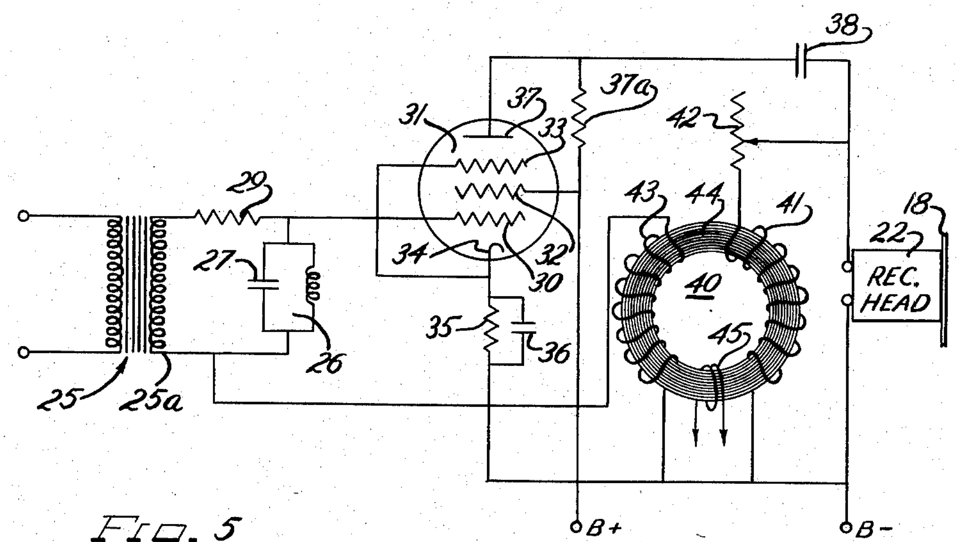
Figure 4 is a schematic illustration of one form of feed-back distortion system embodying the principles of the present invention.

In the system of Figure 4, which is a more detailed schematic of a system incorporating the principles of feed-back distortion as described above with regard to Figure 3, the input signal which is to be recorded linearly and with high fidelity is fed to an input transformer 25 or the like from any desired pickup means or from an amplifier or the like as desired. The secondary 25*a* of the transformer 25 forms an integral part of the mixer stage for this system and has an equalizer circuit or the like 26 comprising a tuned capacitor 27 and inductor 28 connected in parallel. The tuned circuit 26 is preferably substantially isolated from the secondary 25*a* by an isolation resistor 29. The input signal is fed from a junction of equalizer 26 and isolation resistor 29 to the control grid 30 of a mixer amplifier pentode 31. The screen 32 is preferably connected to the B-plus supply and the suppressor 33 is preferably connected directly to the cathode 34 and through a cathode biasing network including a resistor 35 and parallel capacitor 36 to either ground or the B-minus terminal of the power supply as desired. A plate load resistor or the like 37*a* connects the plate 37 to the B-plus supply.

The output from the amplifier stage, from the plate 37 of the pentode 31, is coupled via a coupling and D.-C. isolation capacitor 38 to the recording head 22 which is any preferred form of electromagnetic transducer head across which a magnetic record medium such as the medium 18 relatively passes.

A distortion network corresponding to 23 (Fig. 3) is coupled at its input to the output from the plate circuit 37 of the pentode amplifier 31. At its output it feeds into a point between the equalizer 26 and the transformer secondary 25*a*. This distortion feed-back system includes a transformer device, indicated generally at 40, having a primary 41 connected at one end through a control potentiometer or the like 42 to the input side of the recording head 22 and at its other end to the B minus terminal. The secondary 43 of this transformer device 40 is coupled at one end thereof to the B-minus supply or ground as desired commensurate with the chosen circuitry or the power supply, and at the other end thereof directly to the grid circuit of tube 31.

The core for the transformer 40 is indicated generally by the numeral 44 and is so selected that its properties will provide the proper distortion coupling between the primary 41 and secondary 43 so that the signal fed back will operate to distort the input signal for linearly recording in accordance with the principles of the present invention as described above in connection with Figures 1, 2 and 3 in addition to the general discussion of the principles of the present invention hereinabove set forth. This core 44 is preferably a ring type core such as a doughnut type core often found in current transformers or potential transformers or the like but may have any of the desired configuration and is preferably formed of a material selected for the described characteristics. One preferred core material is a material having magnetic characteristics comparable to the magnetic characteristics of the record member. For example a piece of recording tape 18 may be wound into a ring core or a core can be molded from the powdered material used for tape coating.

Although this core member may be stationary and will effect proper distortion when formed of a material properly selected, a preferred form for the core 44 is to construct it from the same material as the material for the magnetic record member 18 and to rotate the same, for example, in a direction so that any signal which may be impressed thereon by the primary 41 will be subjected to an erase signal by a third coil 45 wound about the transformer core 44 so that the core material passing under the primary 41 has virgin characteristics.

Such a system as this could also be effected by threading the magnetic recording tape 18 through the transformer coils 41 and 43 and erasing whatever signal may be impressed thereon prior to passage of the magnetic record member 18 over the recording head 22.

It will be readily understood from an observation of this system that the system is operable in accordance with the principles of the present invention to distort the intelligence signal to be recorded complementary with respect to the non-linear magnetic transfer characteristic of the magnetic record medium upon which the signal will be recorded. That is, the signal is distorted in a manner relatively inversely with respect to the non-linear magnetic characteristic of the magnetic record medium.

Figures 5, 6, 7:
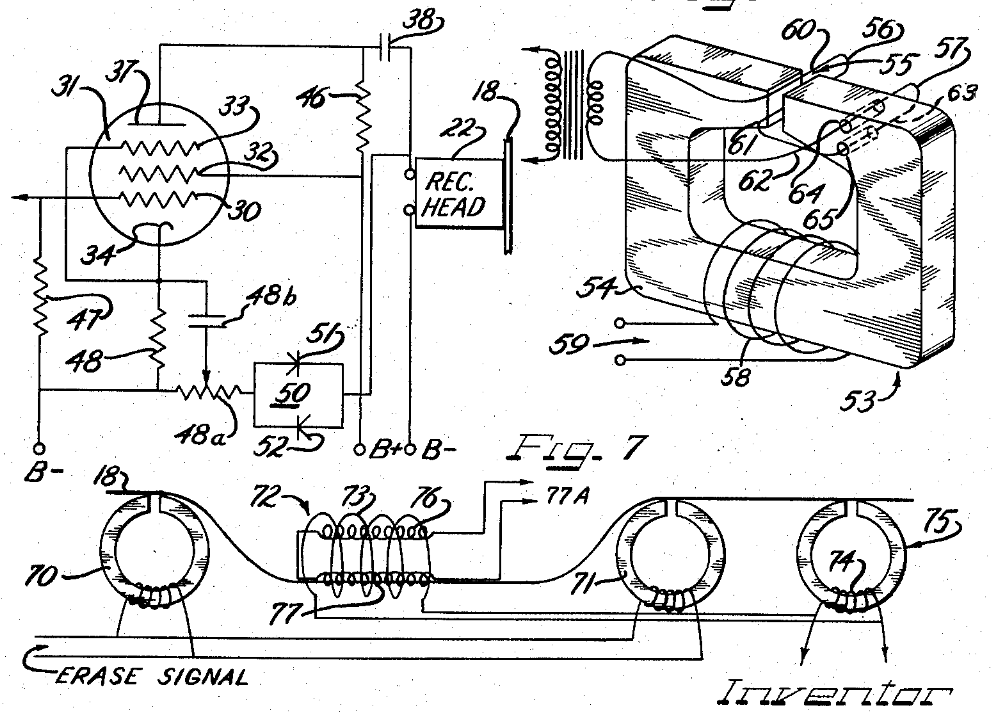
Figures 5, 6, 7 and 8 are other preferred feedback systems for distorting an intelligence signal in accordance with the principles of the present invention.

Another system embodying the principles of the present invention to accomplish distortion through the feed-back method hereinabove described in conjunction with Figure 3, is illustrated in Figure 5 wherein the pentode 31 amplifier mixer derives its input in any desired manner and has its input impressed upon the control grid 30. The output from the plate 37 of the amplifier pentode 31 is again coupled to the recording head 22 through a coupling and D.-C. isolation capacitor 38. The plate circuit 37 is loaded by a resistive element or the like 46 connected to the B-plus supply terminal. The screen 32 of the pentode 31 is also connected to the B-plus supply terminal and the suppressor grid 33 is connected directly to the cathode 34. The control grid 30 is held at B minus potential by a grid resistor or the like 47; and a cathode resistor 48, which is used for bias, may be connected to ground or to the B-terminal. The recording head 22 is also connected to the B-minus supply.

Back-to-back non-linear elements such as selected diodes or copper oxide rectifiers or other type back-to-back rectifier elements having non-linear characteristics selected in accordance with the principles of the present invention so that at low signal strengths they have high resistances and at high signal strengths or high currents they have low resistances, are coupled to the input side of the recording head 22. From the opposite side of the junction of these two back-to-back connected non-linear elements, they are connected to the cathode 34 and suppressor 33 through a potentiometer or the like 48*a* and a coupling capacitor or the like 48*b*.

Recording with this embodiment of the present invention also provides feed-back distortion for linear recording of an intelligence signal upon a record member such as a member 18 having a non-linear magnetic transfer characteristic as described in conjunction with Figure 1 since the nonlinear elements indicated generally by the numeral 50 showing their back-to-back connection and identified individually by the numerals 51 and 52 are selected for non-linear characteristics providing the proper distortion characteristic to the signal to be recorded.

The system of Figure 6 which also embodies the distortion principles of the present invention is not shown in as great detail with regard to the whole system as was the system of Figure 4 but shows in greater detail a magnetic recording head modified in accordance with the principles of the present invention. In this embodiment of the invention, the magnetic recording head, an electromagnetic transducer element, indicated generally at 53, includes a core element 54 which is preferably a ring-type core element but which may be any other desired type thereof, with a gap 55 therein. This system employs two loops or shim elements 56 and 57 which are inductively coupled with the flux in the core element 54 as the same is energized by a voice coil or the like 58 wound thereon as shown or as desired in accordance with the principles known to the magnetic recording art, and provided with an input as at 59.

The loop or shim 56 has one leg thereof, 60 positioned within the gap 55 in close proximity to the upper edge thereof which is the edge over which the magnetic record member will ride. The other leg 61 of the loop or shim 56 is disposed somewhere within the gap 55 out of proximity with the recording face of the gap and core member. The other loop 57 has each of its legs 62 and 63 threaded through the core member 54 as through holes or the like 64 and 65 running transversely through the core member 54 so that the legs 62 and 63 are substantially parallel to the legs 60 and 61 of the loop or shim 56 and substantially parallel with each other. By this arrangement of each of the loops or shims 56 and 57, when the recording head is energized by a signal input as at 59 to the voice coil 58, the loop 56 threads very little flux, resulting in a very low potential across its ends. Similarly, the loop 57 is adjusted to thread on equally small flux so that a similarly low potential is induced thereacross. To provide a null output from the two coils under no recording conditions they are connected in opposition with the leg 61 connected directly to the leg 63 and the legs 60 and 62 providing the output leads from this feed-back distortion system feeding back through a transformer 66 of a high turns ratio.

When recording tape or other type record member is not present on the recording head 53 there will be no output from the feed-back transformer 66. When a tape is provided about the gap 55 for recording thereon, the intensity of the potential induced in the leg 60 will be increased non-linearly in accordance with the non-linear magnetic characteristic of the record member thereby providing an output signal to the feed-back transformer 66 corresponding to the non-linear characteristics of the magnetic record member. This signal may then be fed back in accordance with the above described principles for distorting the input signal to the recording head 53 and permitting linear recording in accordance with the principles of the present invention.

The system illustrated in Figure 7 is a very similarly operating system since the record member 18 is directly coupled to feed-back elements providing a non-linear feed-back complementary to the non-linear characteristics of the magnetic record member 18. In this system, a pair of erase heads 70 and 71 provided with an erase signal as illustrated, are disposed at opposite ends of the feed-back network indicated generally at 72. The feed-back network 72 is provided with a relatively short voice coil or the like 73 to be energized by the signal to be recorded which is the same signal provided to the voice coil 74 of a recording head 75 which is the last stage shown in the system of Figure 7.

A pair of oppositely connected feed-back coils 76 and 77 are equally inductively coupled to the coil 73 and, as stated and illustrated, connected in opposition to provide a null feed-back when the magnetic record member such as a wire or tape or the like 18 is not in circuit. Under such conditions, these coils 76 and 77 will be equally affected by the voice coil 73, which preferably has a length substantially less than one wavelength of the recording signal, and are connected in opposition. Under regular recording conditions, however, the magnetic record member 18 is threaded through one of these feed-back coils, such as the feed-back coil 77, thereby changing the magentic characteristics thereof and the potentials induced therein in accordance with the magnetic characteristics of the tape or wire magnetic record medium 18. This change in the magnetic characteristics of the coil 77 is non-linear in a manner controlled by the non-linear characteristics of the magnetic record medium and thereby has a potential which differs from the potential induced into the feed-back coil 76 in the controlled non-linear manner thus providing a non-linear feed-back signal to the feed-back system through beads 77A. Thereafter, the feed-back signal will be utilized to distort the intelligence signal to be recorded in a manner such as through the distortion characteristic 2 of Figure 1 so that the signal will be recorded linearly on the magnetic record member having non-linear magnetic transfer characteristics.

Figure 8:
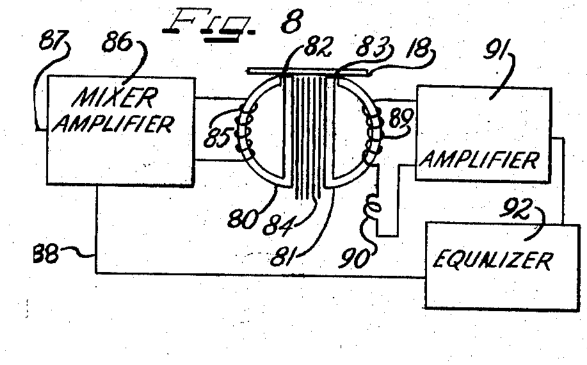

The system of Figure 8 embodying the principles of the present invention for effecting linear magnetic recording via the feed-back method embodying the principles of the present invention is somewhat as similar in its principles to the system of Figures 6 and 7 in that it derives its non-linear characteristic directly from the tape member 18 itself. In this embodiment, a recording head 80 and a monitoring head or the like 81 are positioned so that their gaps 82 and 83 respectively, are spaced apart but a small fraction of a wavelength, and the heads 80 and 81 are preferably magnetically decoupled as by brass or copper shims or the like 84. The voice coil 85 of the recording head 80 derives its input from a mixer amplifier network 86 which has one input from the intelligence signal pickup system as at 87 and another input from the distortion feed-back system via line 88. The monitoring head 81 is provided with a pickup coil 89 serially connected with an adjustable bucking coil 90 oriented and adjusted for maximum de-coupling between the pickup head 81 and the recording head 80. These serially connected coils 89 and 90 feed into an amplifier or the like for regulating the negative feedback and indicated generally at 91. The output of the amplifier is preferably fed to an equalizer or the like 92 and its output is fed, via the line 88, to the mixer amplifier stage 86.

For maximum cancellation, the winding 90 may be wound on a structure reassembling head 81 and placed next to head 81 but without coupling to tape 18.

It will be noted in connection with this system that the de-coupling shims or the like 84 may be eliminated by proper selection and orientation and adjustment of the bucking coil 90 so that there is no coupling between the heads 80 and 81 except through the record member 18.

This embodiment of the present invention as described above and illustrated in Figure 8 operates in much the same manner as the systems of Figures 6 and 7 since the non-linearity of the magnetic characteristic of the magnetic record medium 18 is effective to generate a non-linear potential on the coil 89 feeding the same to the amplifier 91 and equalizer 92 which control the distortion feed to the feed-back amplifier 86 whereby the intelligence signal to be recorded is provided with a distortion characteristic such as the distortion characteristic 2 of the graphic illustration of Figure 1.

Head 81 may be regarded as a sensing element regulating the recording amplifier gain in such a manner that the recorded flux on the tape must be proportional to the input at 87 regardless of the non-linearities in the links in the chain between 83 and 87.

Other systems embodying the principles of the present invention and including feed-back methods of effecting non-linear distortion of the signal to be recorded will be apparent from the several systems hereinabove described but, as stated, these systems are systems embodying the principles of this invention. Other systems embodying the principles of the present invention and in accordance with the direct "attenuation" distortion method described in conjunction with the illustration of Figure 2 are shown in Figures 9–14.

Figure 9:
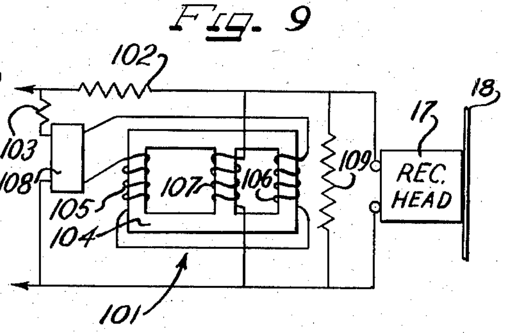

In the system of Figure 9, the input intelligence signal is provided from a substantially constant current amplifier such as an amplifier having an output stage which is a pentode or the like as the amplifier described generally above in Figure 2 and identified by the numeral 15. This signal is fed to a non-linear distortion network indicated generally at 101 and to a recording head 17 which is relatively moving with respect to a magnetic record member 18 having non-linear magnetic transfer characteristics as described. Both the magnetic recording head 17 and the distortion network 101 are isolated from the input system by isolation resistors 102 and 103 or the like so as to prevent undue loading of the input system. The non-linear recording network 101 principally comprises, in this embodiment of the invention, a saturable type reactor having a three-legged core 104, two of the coils of which are D.-C. saturating control coils identified by the numerals 105 and 106 connected serially in opposition to effect saturation of the center leg carrying the distortion coil 107. The control coils are energized through a rectifier system 108 deriving its actuation energy through the isolation resistor 103 from the input line.

The distortion coil 107 is wound on the center saturable leg of the coil 104 and is connected directly across the recording head 17 after the isolation resistor 102 and in parallel relation with a matching resistive element 109.

In the operation of this system, low intensity signals or the low intensity portion of all signals affects the biasing system 108 to provide the core 104 with very low flux density thereby leaving the coil 107 with a very high inductive reactance value. This will permit a maximum passage of signal to the recording head 117 and thereby to the record member 18. On the other hand, high intensity signals create a high bias in the biasing system 108 effecting saturation of the center leg of the core 104 through high energization of the coils 105 and 106 thereby affecting the center leg distortion coil 107 to give the same a very low value for inductive reactance and permitting a passage of high current therethrough thus reducing the energy available to the recording head 17 and thus effecting a reduction in the rate of increase of signal recording. By proper adjustment of the biasing network 108 and by proper selection of the material for the core 104 and the coils 105, 106 and 107 this system can be and is provided with a distortion characteristic such as the distortion characteristic 2 of the graphic illustration of Figure 1. With such a distortion characteristic, the system is permitted linear recording in accordance within the principles of the present invention over the entire possible range of magnetic recording from minimum or zero intensity signals up to maximum intensity signals.

Figure 11:
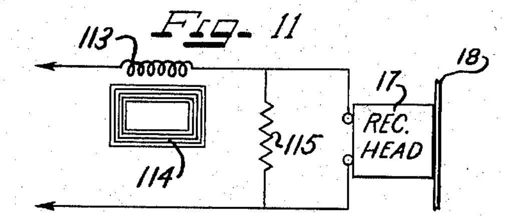
Figures 9, 10, 11, 12, 13 and 14 are schematic illustration of preferred systems for direct distortion of intelligence signals in accordance with the principles of the present invention.
Figure 10:
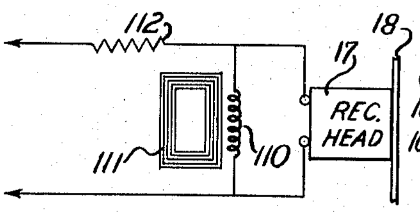

Other systems employing the principles of the present invention and particularly employing the direct "attenuation" distortion method of Figure 2 include the systems of Figures 10 and 11 wherein inductive elements are provided with characteristics appropriate to provide the distortion characteristic desired to the signal to be recorded. In the system of Figure 10, the recording head 17 is connected across an inductive element 110 having a core 111 of selected magnetic properties and isolated from the input by an isolation resistor or the like 112 preventing undue loading on the input system. The material for the core 111 of the inductive element 110 is selected so that normal operation is in the region of the knee of the saturation curve therefor so that low intensity signals will be substantially unattenuated by the system and provided to the recording head 17 with maximum intensity while high intensity signals will operate to saturate the core 111 and be maximumly attenuated by the passage of high by-pass currents through the inductive element 110. In this manner, and by a careful selection of the materials and other parameters of the system, it will operate to provide the linear recording desired in accordance with the principles of the present invention.

The system of Figure 11 is very similar except that the inductive element 113 is provided with a core 114 and is in series with the parallel connected recording head 17 and loading resistor element 115. In this embodiment of the present invention, however, the core material is selected for relatively low permeability so that low intensity signals will pass through the inductive element or coil 113 much as though it was an air core coil and high intensity signals will be partially blocked inductively thereby. Again, proper selection of the parameters of the several elements in this system will provide it with a distortion characteristic in accordance with the principles of the present invention for linear recording on a record medium having non-linear magnetic transfer characteristics.

Figure 12:
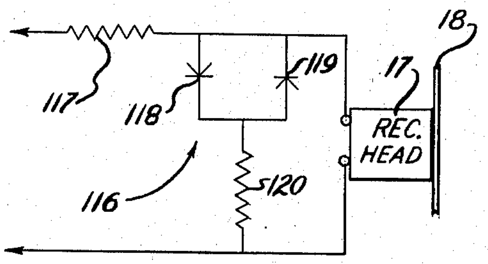
Figure 13:
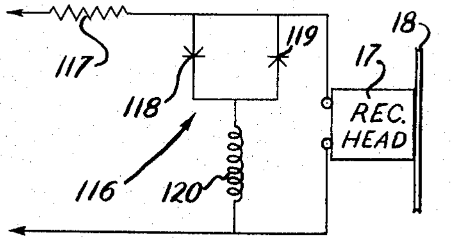

The systems of Figures 12 and 13 similarly embody the principles of the present invention and are operable to provide linear recording on a record member having non-linear magnetic transfer characteristics. In the system of Figure 12, a distortion network 116 and the recording head 17 are isolated by an isolation element such as resistor 117 to prevent loading on the input system. Here, the distortion network 116 is connected in parallel across the electromagnetic transducer element 17 and includes a pair of parallel connected non-linear elements such as diodes or copper oxide rectifier elements or the like 118 and 119 selected to have non-linear characteristics which will provide the proper distortion characteristic such as the distortion characteristic 2 indicated graphically in Figure 1. These non-linear elements are connected together back-to-back and to an additional matching element 120 which may be a resistor or an inductor as found most desirable for matching the non-linear elements 118 and 119 to the electromagnetic transducer element 17 and to the input system. In the system of Figure 12, the matching element is illustrated as a resistor whereas in the system of Figure 13 which is otherwise identical to the system of Figure 12, the matching element is illustrated as an inductor to assist in matching the distortion elements 118 and 119 with the inductive character of the recording head 17. The non-linear elements 118 and 119 will operate very similarly if not substantially identical to the non-linear elements 51 and 52 of the network 50 in the feed-back system of Figure 5 except that they are positioned to operate as distortion "attenuator" elements herein.

Figure 14:
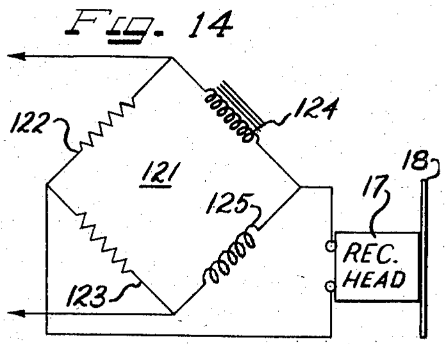

In the system illustrated in Figure 14, the electromagnetic transducer element or recording head 17 having a record member 18 relatively moving thereacross is connected across the output of a bridge network identified generally by the numeral 121. Two series connected legs of this bridge network 121, and particularly legs 122 and 123 carry resistive matched elements while the other two legs carry individually different inductive elements 124 and 125. In this system, the inductive element 124 has been illustrated as an iron core inductance element and the inductor 125 has been illustrated as an air core inductance element. These inductors, in accordance with the principles of the present invention, may be selected and adjusted so that at low intensity signals the maximum signal strength will be provided to the recording head and at high intensity input signal strength the signal provided to the head will be reduced in accordance with a selected portion of the distortion characteristic 2 of the graphic illustration of Figure 1 as desired in accordance with the principles of the present invention. The bridge here is preferably balanced near the upper recording limit to give an unbalance at low recording currents and therefore a maximum output to the head. At high recording current limits the bridge will become substantially balanced and low recording signals will be provided to the recording head in accordance with the principles of the present invention. Such a bridge also gives excellent results as the distortion element in a non-linear feed back system.

From the foregoing, it will be readily observed that I have provided a new and improved method and system for linearly recording an intelligence signal on a magnetic record member having non-linear magnetic transfer characteristics. In accordance with the principles of the present invention, the method and system embodying the same is operable to linearly record from zero signal intensity to maximum signal intensity well within the saturation range of the record member.

While I have shown certain preferred embodiments of my invention, it will, of course, be understood that I do not wish to be limited thereto since many modifications may be made, and I, therefore, contemplate by the appended claim to cover all such modifications as fall within the true spirit and scope of my invention.

I claim as my invention:

Magnetic recording apparatus comprising means for receiving an input signal to be recorded, means for producing a magnetic signal flux for recording on a record medium, means for sensing the recorded flux on the record medium, amplifier means connected to said receiving means and to said sensing means for controlling said flux producing means in accordance with the summation of the signal from said input means and the output from said sensing means to tend to produce a linear recording on the record medium.

References Cited in the file of this patent

UNITED STATES PATENTS

| | | |
|---|---|---|
| 2,313,096 | Shepard, Jr. | Mar. 9, 1943 |
| 2,446,479 | Begun | Aug. 3, 1948 |
| 2,458,641 | Rettinger et al. | Jan. 11, 1949 |
| 2,466,186 | Thompson | Apr. 5, 1949 |
| 2,588,915 | Erikson | Mar. 1, 1952 |
| 2,647,169 | Blaney et al. | July 28, 1953 |
| 2,657,276 | Eliot et al. | Oct. 27, 1953 |
| 2,711,901 | Von Behren | June 28, 1955 |
| 2,775,654 | Weighton et al. | Dec. 25, 1956 |
| 2,776,410 | Guanella | Jan. 1, 1957 |

OTHER REFERENCES

Begun, Magnetic Recording, Murray Hill Books Inc., New York, 1949 (pages 29 and 123–133).